United States Patent [19]

Touval

[11] 4,044,072
[45] Aug. 23, 1977

[54] FLAME RETARDANT COMPOSITIONS AND METHODS FOR THEIR PREPARATION

[75] Inventor: Irving Touval, Edison, N.J.

[73] Assignee: M&T Chemicals Inc., Greenwich, Conn.

[21] Appl. No.: 664,193

[22] Filed: Mar. 5, 1976

Related U.S. Application Data

[63] Continuation-in-part of Ser. No. 325,036, Jan. 19, 1973, abandoned, which is a continuation-in-part of Ser. No. 179,167, Sept. 9, 1971, abandoned, which is a continuation-in-part of Ser. No. 68,538, Aug. 31, 1970, abandoned.

[51] Int. Cl.$^2$ .......................... C08K 5/03; C08K 3/38; C08K 3/22
[52] U.S. Cl. ............................. 260/859 PV; 252/8.1; 260/45.75 W; 260/45.75 D; 260/869; 260/897 C

[58] Field of Search ............... 260/45.75 W, 45.75 D, 260/45.7 R, 859 PV, 869, 897 C; 252/8.1

[56] References Cited

U.S. PATENT DOCUMENTS

| 3,876,549 | 4/1975 | Touval et al. ............... 260/45.75 D |
| 3,907,958 | 9/1975 | Tsujii et al. ................. 260/45.75 D |
| 3,926,883 | 12/1975 | Touval .......................... 260/45.75 D |

*Primary Examiner*—V. P. Hoke
*Attorney, Agent, or Firm*—Robert P. Auber; Kenneth G. Wheeless; Robert Spector

[57] ABSTRACT

Flame retardant polymer compositions comprise stannic oxide hydrate in combination with hydrated zinc borate and a halogen source which may be the polymer itself. The zinc borate comprises from 50 to 65%, by weight of the oxide-borate mixture. Polymers that incorporate these flame retarding compositions exhibit improved flame retardant characteristics together with effective color stability in the presence of heat.

6 Claims, No Drawings

FLAME RETARDANT COMPOSITIONS AND METHODS FOR THEIR PREPARATION

This application is a continuation-in-part of U.S. patent application Ser. No. 325,036 filed Jan. 19, 1973, and now abandoned, which is in turn a continuation-in-part of application Ser. No. 179,167, filed Sept. 9, 1971 and now abandoned, which is in turn a continuation-in-part of applicationn Ser. No. 68,538, filed Aug. 31, 1970 and now abandoned.

This invention relates to flame retardant compositions and to the method for their preparation for introduction into various polymers, such as polyolefins and acrylic polymers, in combination with halogenated organic compounds. More particularly, this invention relates to tin-containing compositions which impart flame retardancy to organic polymers using substantially less tin compound than required in prior art formulations. This invention further relates to flame retardant polymers and resins which exhibit excellent color and stability in those applications where the final product is exposed to elevated temperatures.

With the increased use of polymeric materials, as in the construction industry for example, the flame retardant characteristics of these materials have become increasingly important. In the face of increasingly strict governmental regulations, efforts are being made to develop flame retardant additives for polymers and resins which will improve their flame retardant characteristics without adversely affecting other desirable properties of the final composition, such as imparting unwanted color to the polymer or even more importantly degrading the mechanical characteristics of the polymer so as to decrease its effectiveness for a given end use.

In addition to good performance, the cost of the flame retardant is an important consideration for those commercial applications in which thousands of pounds of polymer will be produced in a single run.

A variety of antimony compounds, e.g. antimony trioxide, have proven satisfactory for the purpose of imparting flame retardancy to many polymer compositions without interfering with their stability either in the environment in which they are to be used or during their preparation. A major shortcoming of antimony compounds is their adverse effect on the tensile properties of polymeric materials when the compounds are employed at the concentration levels required to attain an adequate degree of flame retardancy.

Certain substitutes have been proposed for antimony compounds in flame retarding compositions. These include oxides of zinc, oxide, barium, tin, and combinations of these compounds. Some of the substitutes are less expensive than antimony compounds; however, many are not nearly as effective with respect to their flame retarding ability. In addition, some of these materials adversely affect the tensile and/or esthetic properties of the unmodified polymer in the same manner as antimony compounds. Of these various proposed substitutes, the tin containing compounds have proven most effective; however, certain tin compounds such as hydrated stannic oxide, for example, are considerably more expensive than the corresponding antimony compound. It is, therefore, not economically feasible in many instances to completely replace antimony compounds with these tin compounds.

One object of this invention is to provide flame retardants for resins which enhance the flame retarding characteristics of the polymer into which they are incorporated. It is another object of this invention to provide such flame retardant compositions which produce effective flame retardancy yet do not adversely affect the tensile properties of the polymer into which the flame retardants are incorporated.

It is a further object of this invention to produce highly flame-resistant compositions which achieve effective flame retardancy simultaneously with a substantial reduction in the tin content of the flame retardant when compared against prior art compositions.

It has now been found that in accordance with this invention the combination of stannic oxide hydrate with hydrated zinc borate and a halogen source imparts enhanced flame retarding activity to different classes of polymers without adversely affecting their physical and tensile properties to any significant extent. The improved performance is achieved using less hydrated stannic oxide than required in prior art formulations.

SUMMARY OF THE INVENTION

The flame retardant compositions of this invention comprise a mixture of stannic oxide hydrate and zinc borate hydrate with a halogen source wherein the zinc borate constitutes from 50 to 65% by weight of said mixture.

This invention also encompasses self-extinguishing polymer compositions wherein the aforementioned mixture of hydrated tin oxide and hydrated borate constitutes between about 0.5 and 25 percent by weight of the polymer composition. If the polymer is not a source of active bromine or chlorine at flame temperatures, a suitable external halogen source is required in an amount between about 10 and 50% by weight of the polymer composition, preferably between 30 and 40%.

DETAILED DESCRIPTION OF THE INVENTION

The flame retardants of this invention are suitable for use in a wide variety of halogenated and non-halogenated polymers. If the polymer itself is not a source of active halogen, preferably bromine or chlorine, at flame temperatures, a halogen-containing organic compound is required as one component of the flame retardant composition. Among the preferred halogen sources are chlorine- and bromine- containing aliphatic and aromatic hydrocarbons containing between 1 and 12 carbon atoms. A preferred halogen source is perchloropentacyclodecane.

A comprehensive disclosure of suitable organic halogen sources is contained in a publication entitled "The Flammability Handbook for Plastics" by Carlos Hilado, published by Technomic Publications, Stamford, Conn. (1969).

The organic halogen source preferably constitutes between about 30 and 40% by weight of the flame retardant polymer composition.

Non-halogenated polymers suitable for use with the present flame retardants include:
 polyolefins, e.g. polyethylene, polypropylene, and polystyrene
 copolymers of olefins with other monomers, e.g. acrylonitrile-butadiene-styrene copolymers
 saturated and unsaturated polyesters
 polyurethanes
 acrylic polymers vinyl polymers, e.g. poly(vinyl acetate)

Suitable halogenated polymers, which do not require an external halogen source, include:
poly(vinyl chloride)
poly(vinylidene chloride)
copolymers wherein at least 50% of the repeating units are derived from vinyl chloride and/or vinylidene chloride
polymers of halogenated olefins, e.g. perchloroethylene.

Flame retardant polymer compositions are conveniently prepared by introducing into the desired polymer or resin an amount of the combined tin and zinc compounds of this invention which is substantially the same as one would employ using antimony oxide in prior art formulations. Specifically, the combination of hydrated stannic oxide and hydrated zinc borate constitutes between about 0.5 and 25 parts per hundred parts of resin (phr). The preferred range is determined by the particular resin being treated. For example, poly(vinyl chloride) requires between 0.5 and 10 phr, most preferably 5 phr. For polypropylene or an acrylonitrile-butadiene-styrene copolymer, the preferred concentration of flame retardant is between about 4 and 25 phr, and preferably 8 phr. When used in polyurethanes, the preferred range is 4-14 phr, most preferably 10 phr.

It has been found that although hydrated zinc borate is relatively ineffective as a flame retardant for synthetic organic polymers, when employed in combination with hydrated stannic oxide it makes possible a substantial reduction in the amount of stannic oxide required to achieve a given level of flame retardancy. The hydrated zinc borate can replace from 50 to 65% by weight of the stannic oxide without any substantial sacrifice of flame retardancy, as will be demonstrated by the following examples.

Suitable hydrated stannic oxides contain between 0.1 and 2.0 moles of water per mole of oxide, preferably between 1 and 1.5 moles of water. The zinc borate preferably contains about 3.5 moles of water per mole of borate.

A preferred technique for formulating a flame retardant polymer composition comprises combining the hydrated stannic oxide, hydrated zinc borate, and the active halogen source, if required, and incorporating the resultant mixture into a resin formulation by any conventional method, e.g. milling.

The results achieved using the flame retardants of this invention are considered suprising because a degree of flame retardancy equivalent to that disclosed in the prior art can be achieved using substantially less stannic oxide, since the stannic oxide is used in combination with the less expensive hydrated zinc borate, which when used alone is not an acceptable flame retardant. The economic advantages of the present flame retardants are, therefore, quite apparent, especially for items produced in large quantities.

PROCEDURE FOR FLAMMABILITY EVALUATION

One method for determining the flammability of polymer samples consists of measuring the limiting oxygen index (L.O.I.) value as described in ASTM Test Method No. D-2863-70. The polymer samples are placed in a vertically oriented Pyrex$^{(R)}$ glass tube of approximately 3.5 inches (8.9 centimeters) in diameter and 17.7 inches (45.0 centimeters) in height, which has a bed of glass beads disposed at the bottom thereof to provide a uniform gas stream and a sample holder located about six inches (15 cm.) above the glass beads, by which the specimens are maintained in a vertical position. The gas is introduced at the bottom of the tube by allowing it to flow up through the glass beads. The gas is pure nitrogen, pure oxygen, or a specified mixture of the two. The flow of gas is controlled and monitored by means of suitable valves and flow meters. A flame is then touched to the test sample and the minimum oxygen concentration required to support combustion is noted. The limiting oxygen index is then calculated using the following formula:

$$\text{Limiting Oxygen Index} = \text{LOI} = \frac{[O_2]}{[O_2] + [N_2]} \times 100$$

wherein $[O_2]$ represents the minimum oxygen concentration required to support combustion and $[N_2]$ represents the corresponding concentration of nitrogen.

Specimens exhibiting a limiting oxygen index value less than 21.0 will burn readily in air while those exhibiting a limiting oxygen index greater than 21.0 will will burn sluggishly, if at all, in air.

Untreated polypropylene exhibits a limiting oxygen index value of about 17.3, indicating that it will burn rapidly in air. By contrast, a polypropylene formulation containing 10 phr each of hydrated tin oxide and hydrated zinc borate and 40 phr of perchloropentacyclodecane exhibits a limiting oxygen index of 25.4.

A more severe flammability test has been developed by Underwriter's Laboratory (Test No. 94) and is described in the October, 1970 issue of MODERN PLASTICS. Samples are rated according to the following criteria:

Class 0 - Solid and molten polymer are self-extinguishing within five seconds following removal of flame.

Class I - Solid and molten polymer are self-extinguishing within 25 seconds following removal of flame.

Class II - Only the solid polymer is self-extinguishing within 25 seconds following removal of flame.

The test samples were prepared by combining a commercial grade of polypropylene (PROFAX$^{(R)}$ 6523, manufactured by Hercules Inc.) with specified amounts of perchloropentacyclodecane, zinc borate hydrate [$Zn_3(BO_3)_2 \cdot 3.5H_2O$], and stannic oxide hydrate ($SnO_2 \cdot 1.4H_2O$) on two roll mill heated to a temperature of 325° F. (164° C.) for five minutes. The mass was cooled and chopped into 0.125 inch (0.318 cm)-size pellets. The pellets were then injection molded at 480° F. (250° C.) under a pressure of 1000 p.s.i. (7.0 × 10$^4$ g/cm$^2$) to form a bar measuring 6 inches × 0.5 inches × 0.125 inches (15 cm. × 1.3 cm. × 0.317 cm.). Each sample contained 100 parts by weight of polypropylene in addition to the following ingredients:

|  | SAMPLE A | SAMPLE B | SAMPLE C | SAMPLE D | SAMPLE E |
|---|---|---|---|---|---|
| Perchloropenta-cyclodecane | (control) 40 | 40 | 40 | 40 | (control) 40 |
| Zinc borate | 15 | 13 | 10 | — | 20 |

| -continued | | | | | |
|---|---|---|---|---|---|
| | SAMPLE A | SAMPLE B | SAMPLE C | SAMPLE D | SAMPLE E |
| hydrate | | | | | |
| Stannic Oxide hydrate | 5 | 7 | 10 | 20 | — |

Sample F, containing only polymer, was used as a second control. The test results are summarized in Table I.

TABLE I

| | SAMPLE A | SAMPLE B | SAMPLE C | SAMPLE D | SAMPLE E | SAMPLE F |
|---|---|---|---|---|---|---|
| L.O.I. Value | 23.9 | 24.2 | 25.4 | 24.7 | (control) N.D. | (control) 17.9 |
| U.L.[1] | Fail | I | I | I | Fail | Fail |

[1] = Underwriter's Laboratory Test No. 94
N.D. = Not measured. Sample burns readily in air.

While the methods and compositions herein disclosed form preferred embodiments of this invention, this invention is not limited to those specific methods and compositions, and changes can be made therein without departing from the scope of the invention, which is defined in the appended claims.

What is claimed is:

1. A flame retarding composition for use with normally flammable non-halogen-containing polymeric materials, said composition comprising a mixture of stannic oxide hydrate, zinc borate hydrate and between 10 and 50%, based on the combined weight of said composition and the non-halogen-containing polymer, of a halogen source selected from the group consisting of chlorine-containing hydrocarbons, bromine-containing hydrocarbons, poly(vinyl chloride), poly(vinylidene chloride) and copolymers containing at least 50% of repeating units derived from one or both of vinyl chloride and vinylidene chloride, wherein the zinc borate hydrate constitutes from 50 to 65%, based on the combined weight of the stannic oxide hydrate and zinc borate hydrate.

2. The flame retardant composition of Claim 1 wherein the stannic oxide hydrate and zinc borate hydrate are present in equal parts by weight.

3. A polymer composition possessing enchanced flame retardng characteristics comprising a normally flammable non-halogen-containing polymer selected from the group consisting of polyolefins, polyesters, vinyl polymers, polyurethanes and acrylic polymers in combination with a) between 10 and 50%, based on the weight of said polymer composition, of a halogen source selected from the group consisting of chlorine-containing hydrocarbons, bromine-containing hydrocarbons, poly(vinyl chloride), poly(vinylidene chloride) and copolymers wherein at least 50% of the repeating units are derived from one or both of vinyl chloride and vinylidene chloride, and b) from 0.5 to 25 parts by weight per 100 parts of said polymer, of a mixture of hydrated stannic oxide and hydrated zinc borate wherein the zinc borate constitutes from 50 to 65%, based on the total weight of said mixture.

4. The polymer composition of claim 3 wherein the concentration of halogen source is between about 30 and 40 weight percent based on said polymer.

5. The polymer composition of claim 3 wherein said polymer is polypropylene.

6. The polymer composition of claim 3 wherein the stannic oxide hydrate and zinc borate hydrate are present in equal parts by weight.

* * * * *